(12) United States Patent
Nagatani et al.

(10) Patent No.: US 6,782,055 B1
(45) Date of Patent: Aug. 24, 2004

(54) RECEIVER CIRCUIT FOR A COMMUNICATION SYSTEM

(75) Inventors: Yuji Nagatani, Wako (JP); Kazuya Iwamoto, Wako (JP); Hiroshi Hashimoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 776 days.

(21) Appl. No.: 09/618,230

(22) Filed: Jul. 18, 2000

(51) Int. Cl.$^7$ ................................................. H04B 3/00
(52) U.S. Cl. ........................ 375/257; 333/24 R; 333/172
(58) Field of Search ................................. 375/257, 258; 333/24 R, 24 C, 172, 174, 175, 176

(56) References Cited

U.S. PATENT DOCUMENTS 5,864,531 A * 1/1999 Horigome .............. 369/124.04

* cited by examiner

Primary Examiner—Amanda T. Le
(74) Attorney, Agent, or Firm—Lahive & Cockfield, LLP; Anthony A. Laurentano

(57) ABSTRACT

A receiver circuit that can obtain a reception signal with accuracy in high-speed communications using two-wire transmission lines. The receiver circuit receives information signals in a communication system with two-wire transmission lines for transmitting the information signals in opposite phases to each other. The receiver circuit includes an alternating-current coupling arrangement provided for each of the two-wire transmission lines and for extracting alternating-current components of the information signals inputted through the transmission lines. The receiver circuit also includes a reception signal generating arrangement for obtaining a reception signal corresponding to the information signals in accordance with output signals from each of the alternating-current coupling arrangements. Each of the alternating-current coupling arrangements include two time constant circuits having time constants different from each other and connected in parallel to each other between an input and output thereof.

2 Claims, 8 Drawing Sheets

FIG. 2A
(Prior Art)
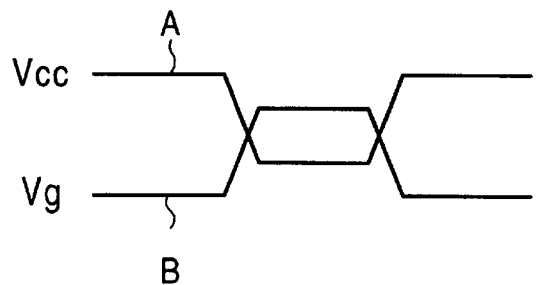
FIG. 2B
(Prior Art)
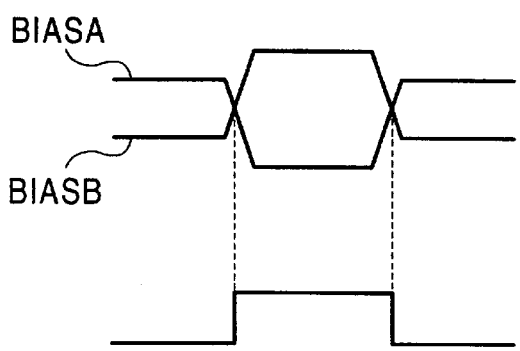
FIG. 2C
(Prior Art)
FIG. 2D
(Prior Art)
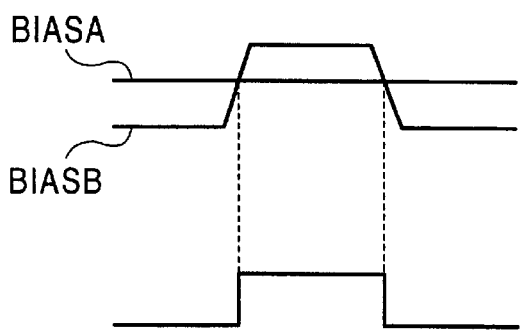
FIG. 2E
(Prior Art)
FIG. 2F
(Prior Art)
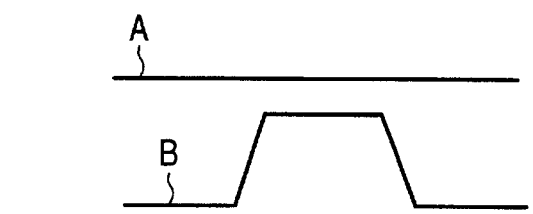

FIG. 3A  INPUT 
(Prior Art)
FIG. 3B  OUTPUT 
(Prior Art)
FIG. 4A  INPUT 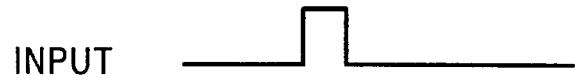
(Prior Art)
FIG. 4B  OUTPUT 
(Prior Art)

FIG. 5A  INPUT 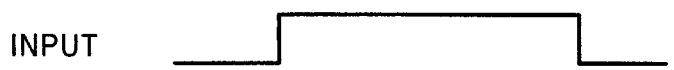
(Prior Art)
FIG. 5B  OUTPUT 
(Prior Art)
FIG. 6A  INPUT 
(Prior Art)
FIG. 6B  OUTPUT 
(Prior Art)

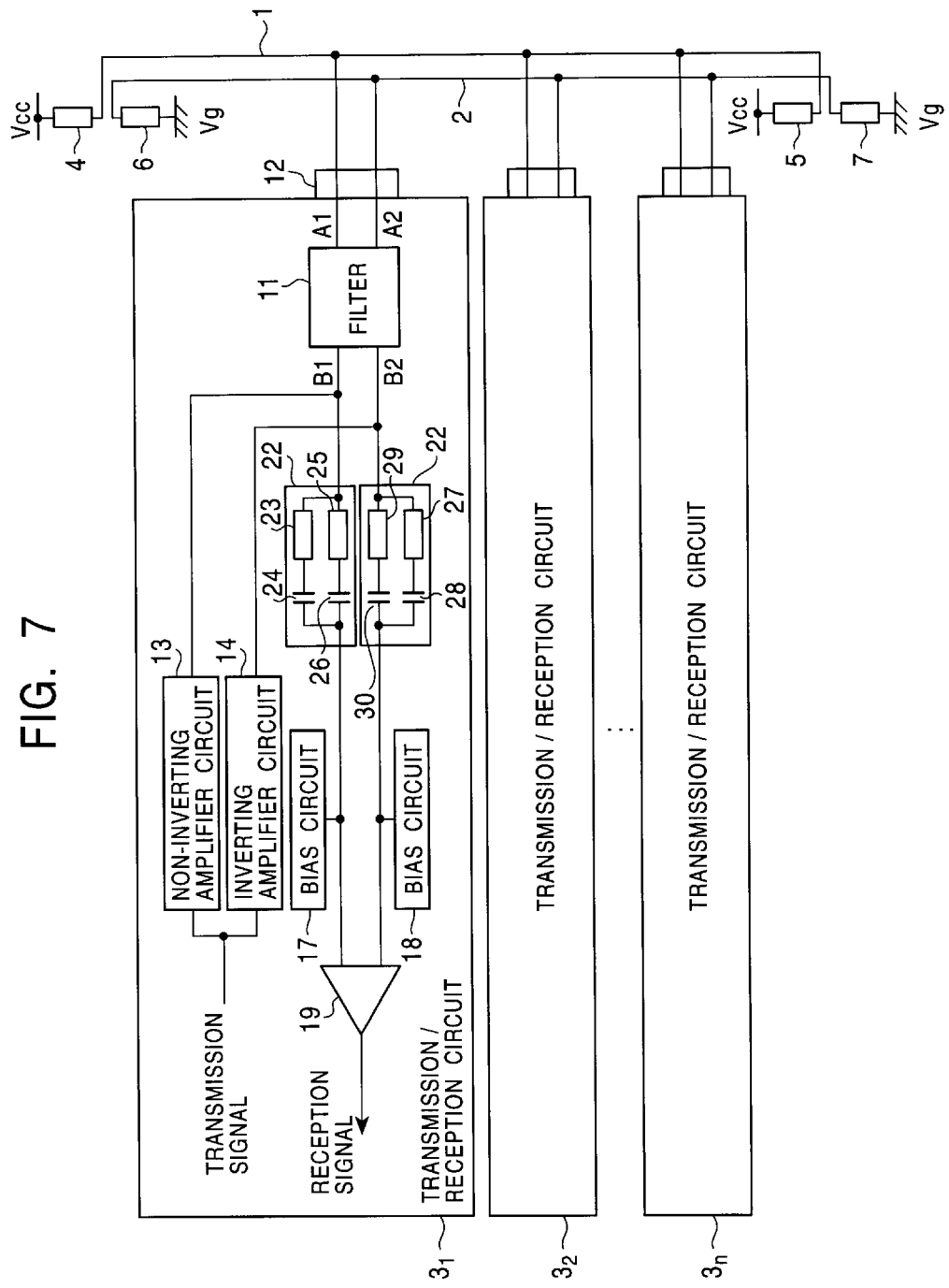

FIG. 8A  INPUT 
FIG. 8B  OUTPUT FROM TIME CONSTANT CIRCUIT WITH A SMALL TIME CONSTANT 
FIG. 8C  OUTPUT FROM TIME CONSTANT CIRCUIT WITH A LARGE TIME CONSTANT 
FIG. 8D  COMBINED OUTPUT 
FIG. 9A  INPUT 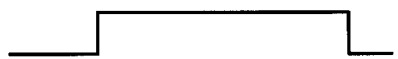
FIG. 9B  OUTPUT FROM TIME CONSTANT CIRCUIT WITH A SMALL TIME CONSTANT 
FIG. 9C  OUTPUT FROM TIME CONSTANT CIRCUIT WITH A LARGE TIME CONSTANT 
FIG. 9D  COMBINED OUTPUT 

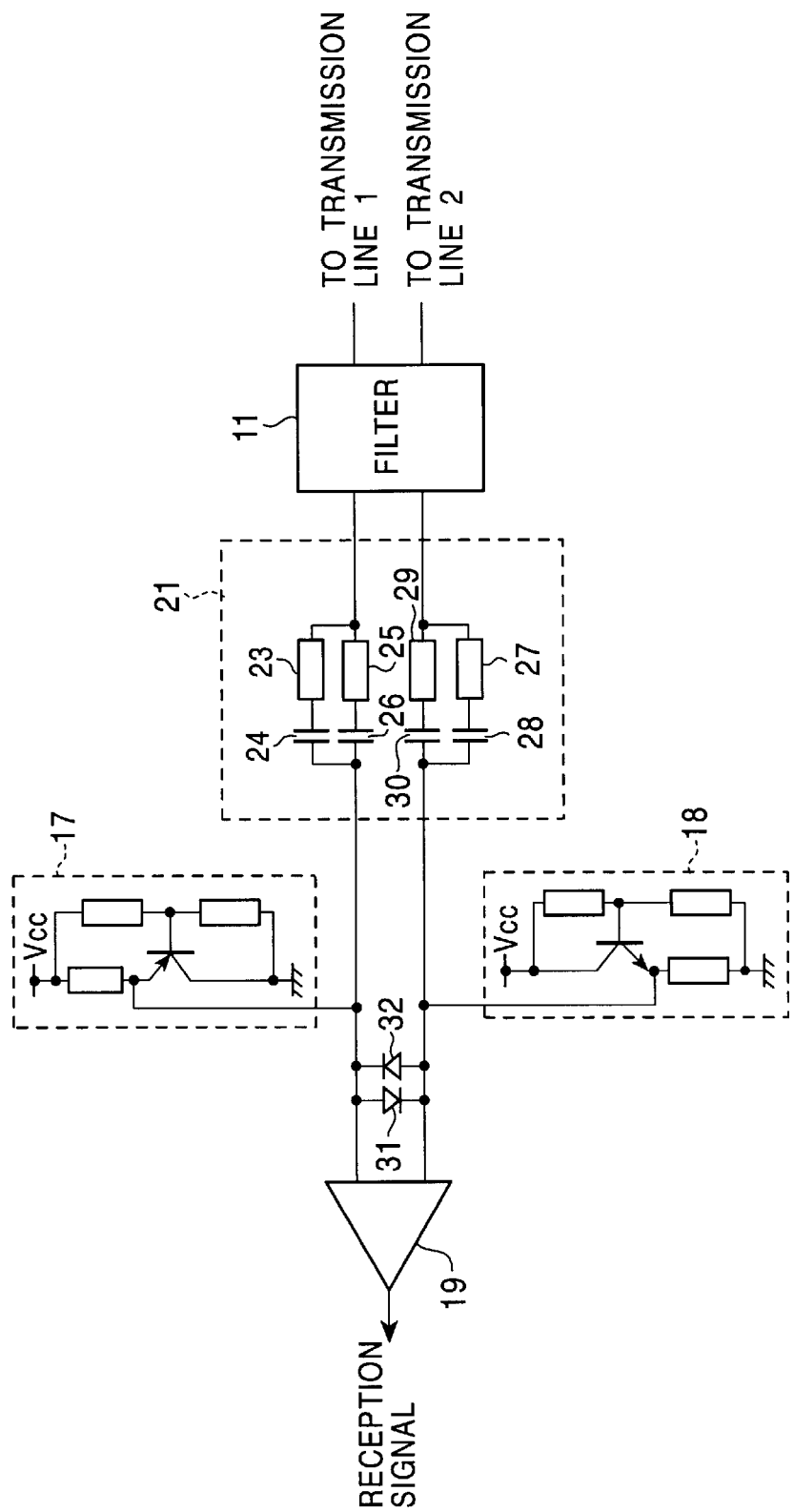

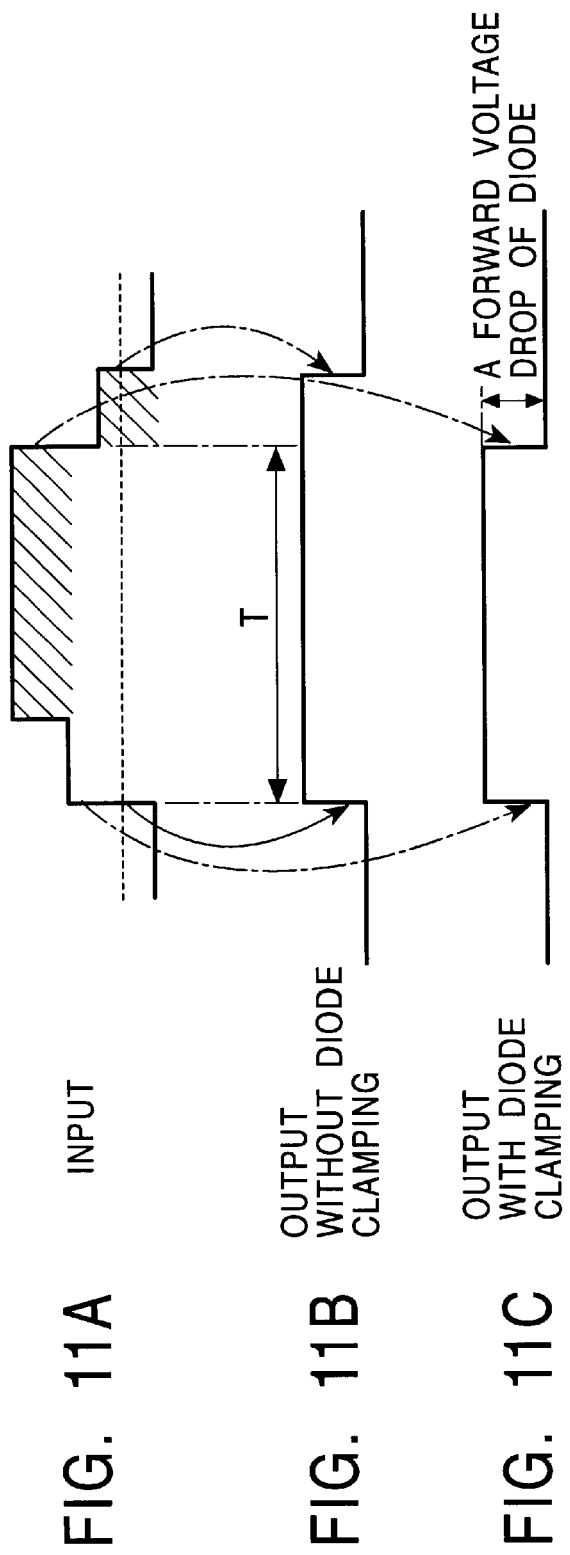

RECEIVER CIRCUIT FOR A COMMUNICATION SYSTEM

BACKGROUND OF THE INVENTION

1. Field of the Invention

The present invention relates to a communication system that comprises a plurality of nodes connected in common to transmission lines.

2. Description of the Related Art

As shown in FIG. 1, in a prior-art communication system, two-wire transmission lines 1, 2 are connected with transmission/reception circuits $3_1$ through $3_n$ as a plurality of nodes. All the transmission/reception circuits $3_1$ through $3_n$ comprise the same components. Positive potential Vcc (for example, 5V) is supplied to one end of the transmission line 1 via a terminal resistor 4 and positive potential Vcc is supplied to the other end via a terminal resistor 5 in the same way. Ground potential Vg (for example, 0V) is supplied to one end of the transmission line 2 via a terminal resistor 6 and ground potential Vg is supplied to the other end via a terminal resistor 7 in the same way.

In the transmission/reception circuit $3_1$ a two-way I/O filter 11 is connected to the transmission lines 1, 2 via a connector 12. Connecting terminals A1, A2 are provided for connecting the I/O filter 11 to the transmission lines 1, 2 and connecting terminals B1, B2 arranged as opposed to the connecting terminals A1, A2. A transmission signal is individually supplied to the connecting terminals B1, B2 via a non-inverting amplifier circuit 13 and an inverting amplifier circuit 14. In addition, bias circuits 17, 18 are connected to the connecting terminals B1, B2 of the filter 11 via AC coupling circuits 15, 16 which comprise resistors 15a, 16a and capacitors 15b, 16b, respectively. Each of the signals provided by the bias circuits 17, 18 serves as a reception signal via a comparator 19 comprising a differential amplifier.

Upon outputting the transmission signal, the signal is amplified by the non-inverting amplifier circuit 13 and amplified in an inverted manner by the inverting amplifier circuit 14 as well. Transmission signals having opposite phases to each other are supplied to the filter 11 from the non-inverting amplifier circuit 13 and the inverting amplifier circuit 14. The filter 11 serves as a low-pass filter to allow the transmission signals to pass individually therethrough. An output transmission signal from the non-inverting amplifier circuit 13 passes through the filter 11 and is thereafter supplied to the transmission line 2. An output transmission signal from the inverting amplifier circuit 14 passes through the filter 11 and is thereafter supplied to the transmission line 1.

On the other hand, the information signals transmitted through each of the transmission lines 1, 2 are supplied to the filter 11. The filter 11 acts as a low-pass filter on each of these information signals to output signals to the AC coupling circuits 15, 16. Each of the AC coupling circuits 15, 16 extracts AC components of the information signals and supplies the components to the bias circuits 17, 18, respectively.

For example, as shown in FIG. 2A, consider the case where a signal A transmitted through the transmission line 1 and a signal B transmitted through the transmission line 2 vary in phase opposite to each other. As shown in FIG. 2B, the bias circuit 17 applies a bias voltage to the information signal A to obtain a biased signal BIASA, while the bias circuit 18 applies a bias voltage to the information signal B to obtain a biased signal BIASB. As shown in FIG. 2C, the comparator 19 detects each of the output signals BIASA, BIASB from the bias circuits 17, 18 as a reception signal.

When a break has occurred in the transmission line 1, only the signal B is transmitted through the transmission line 2. Accordingly, as shown in FIG. 2D, the biased signal BIASA remains constant, whereas the biased signal BIASB to the signal B, transmitted through the transmission line 2, to which a bias voltage has been applied changes in the same way as the signal B. The comparator 19 compares the constant biased signal BIASA with the biased signal BIASB to obtain a reception signal as shown in FIG. 2E. This holds true even when the transmission line 1 is grounded or when the transmission line 2 is broken or grounded.

Furthermore, no reception signals could be detected without the bias circuits 17, 18 when a break occurred in the transmission line 1 since the signals A, B to be inputted into the comparator 19 would have the waveforms shown in FIG. 2F.

Other transmission/reception circuits $3_2$ through $3_n$ also have the same configuration and operation as those of the transmission/reception circuit $3_1$. Furthermore, the aforementioned prior-art communication system is disclosed, for example, in Japanese Patent Laid-Open Publications No.Hei 3-171849. In addition, such a system as has the aforementioned AC coupling circuits 15, 16 at the input stage of the receiver circuit is disclosed, for example, in Japanese Patent Laid-Open Publications No.Hei 1-317007 and No.Hei 1-261047.

As described above, the transmission/reception circuit is provided, at the input stage of the receiver circuit portion thereof, with the AC coupling circuits 15, 16 to extract from an information signal transmitted only desired frequency components that include information regarding each of the bits given when transmitted. However, the AC coupling circuit comprises a time constant circuit with a resistor and a capacitor connected in series, so that the time constant given by the resistor and the capacitor exert an effect on the input information signal. That is, a large time-constant would cause the passing frequency bandwidth to become broad but the response to the input information signal to become slow. On the other hand, a small time-constant would cause the passing frequency bandwidth to become narrow but the response to the input information signal to become quick. As shown in FIG. 3A and FIG. 4A, consider the case where the input information signal is a square wave of one bit, short in terms of time, and the time constant is large. In this case, the output signal waveform of the AC coupling circuit changes in a transient manner at the time of rising and falling as shown in FIG. 3B, so that a square wave cannot be obtained. On the other hand, if the time constant is small, the output signal waveform of the AC coupling circuit will be given a square wave with sharp rising and falling edges as shown in FIG. 4B.

As shown in FIG. 5A and FIG. 6A, consider the case where the input information signal is a square wave of a plurality of bits, long in terms of time and having a continuous high level, and the time constant is large. In this case, the output signal waveform of the AC coupling circuit changes in a transient manner at the time of rising and falling as shown in FIG. 5B, however, a square wave can be obtained since a constant level corresponding to the high level is sustained. On the other hand, if the time constant is small, the output signal waveform of the AC coupling circuit will be given a square wave with sharp rising and falling edges as shown in FIG. 6B. However, since the level of the waveform is gradually reduced from the rising edge to the falling edge, a square wave cannot be obtained.

The information signal consists of a train of bits and the passing frequency bandwidth needs to be broadened in consideration of the bits having a continuous logic "1" level corresponding to the high level in the train of bits. Generally, the time constant of the AC coupling circuit is given a large value in accordance with the maximum number of bits that have a continuous logic "1" level in the train of bits. However, as can be seen from the foregoing, the passing frequency bandwith becomes broad but the response to the input information signal become slow when the time constant is large. Accordingly, the square wave portion formed only of a bit with logic "1" level in the information signal changes in a transient manner at time of rising and falling and thus a square wave cannot be given. Therefore, when such an AC coupling circuit is provided at the input stage of the receiver circuit portion, no accurate reception signal can be obtained and thus high-speed communications cannot be achieved.

OBJECTS AND SUMMARY OF THE INVENTION

In view of the aforementioned circumstances, the object of the present invention is to provide a receiver circuit that can obtain a reception signal with accuracy in high-speed communications using two-wire transmission lines.

The receiver circuit according to the present invention receives information signals in a communication system with two-wire transmission lines for transmitting the information signals in opposite phase to each other. The receiver circuit comprises an alternating-current coupling means provided for each of the two-wire transmission lines and for extracting alternating-current components of the information signals inputted through the transmission lines. The receiver circuit also comprises a reception signal generating means for obtaining a reception signal corresponding to the information signals in accordance with output signals from each of the alternating-current coupling means. Each of the alternating-current coupling means is comprised of two time constant circuits having time constants different from each other and connected in parallel to each other in between an input and output thereof.

According to the receiver circuit of the present invention, each of the AC coupling means comprises two time-constant circuits, connected in parallel to each other in between the input and output thereof with time constants different from each other. Accordingly, each of the AC coupling means allows information signals with different frequency bandwidths to pass through each of the two time constant circuits and to be combined into an output signal to be outputted. Since the resulting combined signal has a waveform generally the same as that of the input signal that is inputted into the AC coupling means, the reception signal can be correctly obtained in high-speed communications using two-wire transmission lines. Furthermore, in the receiver circuit of a communication system of the present invention, the time constant of one of the two time constant circuits is made smaller according to the minimum number of bits having a continuous logic "1" level in a train of bits in an information signal transmitted. On the other hand, the time constant of the other one of the two time constant circuits is made larger according to the maximum number of bits having a continuous logic "1" level in a train of bits in a transmitted information signal.

BRIEF DESCRIPTION OF THE DRAWINGS

FIGS. 2A through 2F are views showing waveforms of transmitted signals in a prior-art communication system.

FIGS. 3A and 3B show an output signal waveform corresponding to an input signal of a square wave, short in terms of time, in an AC coupling circuit having a large time constant.

FIGS. 4A and 4B show an output signal waveform corresponding to an input signal of a square wave, short in terms of time, in an AC coupling circuit having a small time constant.

FIGS. 5A and 5B show an output signal waveform corresponding to an input signal of a square wave, long in terms of time, in an AC coupling circuit having a large time constant.

FIGS. 6A and 6B show an output signal waveform corresponding to an input signal of a square wave, long in terms of time, in an AC coupling circuit having a small time constant.

FIG. 7 is a block diagram showing an embodiment of the present invention.

FIGS. 8A through 8D show the waveform of output signals and their combined signal of time constant circuits, corresponding to an input signal, short in terms of time, in the AC coupling circuit of FIG. 7.

FIG. 9A through 9D show the waveform of output signals and their combined signal of time constant circuits, corresponding to an input signal, long in terms of time, in the AC coupling circuit of FIG. 7.

FIG. 10 is a circuit diagram showing another embodiment of the present invention.

FIGS. 11A through 11C are views of waveforms showing the operation of the receiver circuit of FIG. 10.

DETAILED DESCRIPTION OF THE PREFERRED EMBODIMENTS

Figure 1:
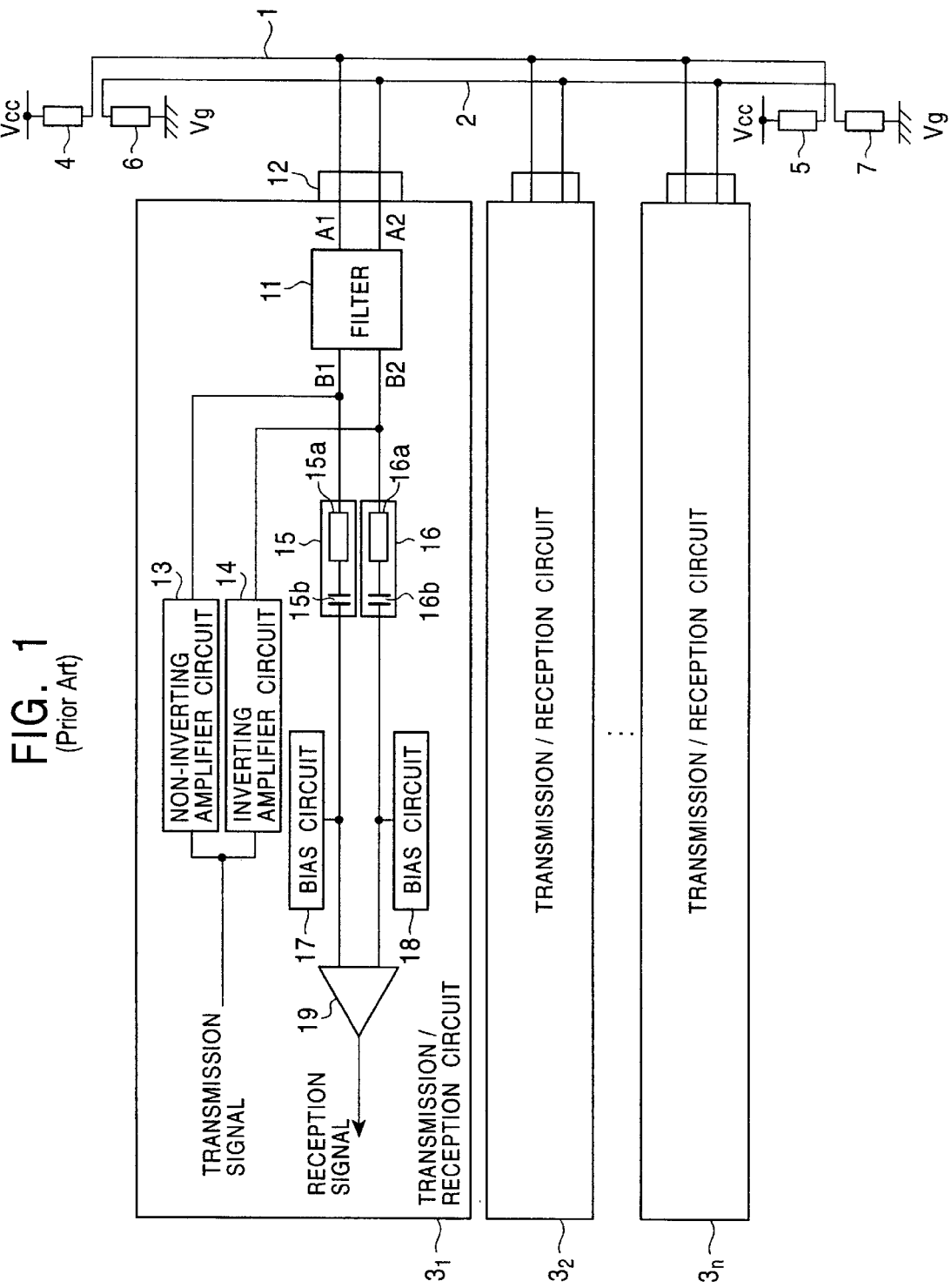
FIG. 1 is a block diagram showing a prior-art communication system.

The embodiments of the present invention will be explained below in detail with reference to the drawings.

FIG. 7 shows a communication system that comprises the receiver circuit according to the present invention, where the reference symbols that designate the same components as those of the prior art communication system shown in FIG. 1 remain the same. Line L1 that leads from the output terminal B1 of the filter 11 to the comparator 19 is connected with an AC coupling circuit 21. Line L2 that leads from the output terminal B2 of the filter 11 to the comparator 19 is connected with an AC coupling circuit 22.

Each of the AC coupling circuits 21, 22 is connected in parallel with two series circuits, each comprising a resistor and a capacitor. That is, the AC coupling circuit 21 is connected in parallel with a time constant circuit comprising a resistor 23 and a capacitor 24, connected in series, and a time constant circuit comprising a resistor 25 and a capacitor 26, connected in series. Likewise, the AC coupling circuit 22 is connected in parallel with a time constant circuit comprising a resistor 27 and a capacitor 28, connected in series, and a time constant circuit comprising a resistor 29 and a capacitor 30, connected in series.

Time constants given by the resistor 23 and the capacitor 24 and by the resistor 27 and the capacitor 28 are given a small value corresponding to the minimum number of bits having a continuous logic "1" level in a train of bits of the information signal transmitted. On the other hand, time constants given by the resistor 25 and the capacitor 26 and by the resistor 29 and the capacitor 30 are given a large value corresponding to the maximum number of bits having a continuous logic "1" level in the train of bits of the transmitted information signal.

Other configurations are the same as that of the prior art communication system shown in FIG. 1. Moreover, the transmission/reception circuits $3_2$ through $3_n$ have the same configuration as that of the transmission/reception circuits $3_1$. Furthermore, the receiver circuit comprises the AC coupling circuits (AC coupling means) 21, 22, the bias circuits 17, 18, and the comparator 19. The reception signal generating means correspond to the bias circuits 17, 18 and the comparator 19.

In the communication system configured as described above, information signals transmitted through each of the transmission lines 1, 2 are supplied to the filter 11. The filter 11 serves as a low-pass filter to allow information signals to pass individually therethrough and outputs the signals to the AC coupling circuits 21, 22.

In the AC coupling circuit 21, the information signal from the output terminal B1 of the filter 11 is supplied to each of the two time constant circuits having time constants different from each other. In the AC coupling circuit 22, the information signal from the output terminal B2 of the filter 11 is supplied to each of the two time constant circuits having time constants different from each other.

Now, the operation of the AC coupling circuit 21 is explained. As shown in FIG. 8A, first consider the case where an input signal has a square waveform, short in terms of time, like one for one bit. In this case, the output signal from the time constant circuit comprising the resistor 23 and the capacitor 24 with a small time-constant will be given a square waveform having sharp rising and falling properties as shown in FIG. 8B. On the other hand, the waveform of the output signal from the time constant circuit comprising the resistor 25 and the capacitor 26 with a large time-constant will change in a transient manner at the time of rising and falling as shown in FIG. 8C. The two output signals having such waveforms are combined at the output side of the AC coupling circuit 21 to form the combined signal waveform of a square wave, which is generally the same as the input signal waveform shown in FIG. 8D.

Now, consider the case where the input information signal has a square waveform, long in terms of time, and having a high level continuous over a plurality of bits as shown in FIG. 9A. In this case, the output signal from the time constant circuit comprising the resistor 23 and the capacitor 24 with a small time constant will be given a sharp waveform with the sharp rising and falling edges as shown in FIG. 9B. However, the level of the waveform gradually reduces from the rising edge toward the falling edge. On the other hand, the waveform of the output signal from the time constant circuit comprising the resistor 25 and the capacitor 26 with a large time-constant will change in a transient manner at the time of rising and falling as shown in FIG. 9C. However, such a waveform as has a continuous constant level corresponding to a high level can be obtained between the rising and falling edges. The two output signals having such waveforms are combined at the output side of the AC coupling circuit 21 to form the combined signal waveform of a square wave, which is generally the same as the input signal waveform shown in FIG. 9D.

As described above, the AC coupling circuit 21 can provide an output combined signal having a square wave generally the same as the input signal waveform. This can be achieved if the number of bits having a continuous logic "1" level corresponding to a high level in a train of bits of the input signal lies in between the aforementioned maximum and minimum number of bits.

This operation of the AC coupling circuit 21 is also carried out in the AC coupling circuit 22.

Output signals from each of the AC coupling circuits 21, 22 are supplied to the bias circuits 17, 18. The bias circuit 17 applies a bias voltage to the information signal A to generate a biased signal BIASA, while the bias circuit 18 applies a bias voltage to the information signal B to generate a biased signal BIASB. The comparator 19 detects the output signal from each of the bias circuits 17, 18 as a reception signal.

FIG. 10 shows another embodiment of the present invention. In this embodiment, the comparator 19 is provided with two diodes 31, 32, disposed in parallel in between the inputs thereof with one directed opposite to the other. The diodes 31, 32 constitute a clamping circuit.

The waveform of some information signals are distorted due to a reflection effect in the transmission lines 1, 2. Accordingly, for example, such an information signal with a distorted waveform as shown in FIG. 11A can be inputted to each of the AC coupling circuits 21, 22. The hatching portion in the waveform shown in FIG. 11A is caused by a distortion due to reflection. This information signal has a width longer than the pulse width T given at the time of actual transmission. The diodes 31, 32 acts effectively on these waveform distortions. Without the diodes 31, 32, the comparator 19 would perform the comparison operation employing the level as shown by dashed lines of FIG. 11A as a threshold value. Accordingly, the reception signal outputted from the comparator 19 would have a pulse width wider than the pulse width T as shown in FIG. 11B, thus causing a signal having a waveform different from that given at the time of transmission to be received. On the other hand, with the diodes 31, 32, the reception signal can be detected as a signal with the pulse width T due to the clamping action of the diodes 31, 32 as shown in FIG. 11C. That is, even when the waveform of an information signal is distorted due to a reflection effect in the transmission lines 1, 2, the distortion can be compensated.

Furthermore, in the aforementioned embodiment, the receiver circuit has been explained as part of the transmission/reception circuit, however, a transmitter circuit and a receiver circuit may be formed individually. In addition the filter 11 is an EMI filter for eliminating noise and is not necessarily required in the receiver circuit.

Furthermore, in the aforementioned embodiment, the time constant circuits of the AC coupling circuits 21, 22 are series circuits comprising resistors and capacitors. However, the present invention is not limited thereto and can employ any configuration so long as it is provided with a time constant for extracting AC components.

As described above, according to the receiver circuit of the present invention, each of the AC coupling means comprises two time-constant circuits, connected in parallel to each other in between the input and output thereof with time constants different from each other. Accordingly, each of the AC coupling means allow information signals with different frequency bandwidths to pass through each of the two time constant circuits and to be combined into an output signal to be outputted. Since the resulting combined signal has a waveform generally the same as that of the input signal that is inputted into the AC coupling means, the reception signal can be correctly obtained in high-speed communications using two-wire transmission lines.

The present invention has been explained with reference to the preferred embodiments. However, those skilled in the art will recognize that various changes and modifications may be made therein. It is intended to cover, in the appended claims, all such changes and modifications as fall within the true spirit and scope of the invention.

What is claimed is:

1. A receiver circuit for receiving information signals transmitted through two-wire transmission lines in a communication system, said information signals being in opposite phases to each other, comprising alternating-current coupling means provided for each of said two-wire transmission lines and for extracting alternating-current components of said information signals inputted through said transmission lines, and reception signal generating means for obtaining a reception signal corresponding to said information signals in accordance with out put signals from each said alternating-current coupling means, each of said alternating-current coupling means being comprised of two time constant circuits respectively having fixed time constants different from each other and connected in parallel to each other between the input and output thereof.

2. A receiver circuit for receiving information signals transmitted through two-wire transmission lines in a communication system, said information signals being in opposite phases to each other, comprising alternating-current coupling means provided for each of said two-wire transmission lines and for extracting alternating-current components of said information signals inputted through said transmission lines, and reception signal generating means for obtaining a reception signal corresponding to said information signals in accordance with output signals from each of said alternating-current coupling means, each of said alternating-current coupling means being comprised of two time constant circuits having time constants different from each other and connected in parallel to each other between the input and output thereof, wherein a time constant of one of said two time constant circuits is decreased according to a minimum number of bits having a continuous logic "1" level in a train of bits in an information signal transmitted, while a time constant of the other one of said two time constant circuits is increased according to a maximum number of bits having a continuous logic "1" level in a train of bits in transmitted information signal.

* * * * *